(12) United States Patent
Todd et al.

(10) Patent No.: US 8,135,760 B1
(45) Date of Patent: Mar. 13, 2012

(54) DETERMINING THE LINEAGE OF A CONTENT UNIT ON AN OBJECT ADDRESSABLE STORAGE SYSTEM

(75) Inventors: Stephen Todd, Shrewsbury, MA (US); John D. Hushon, Jr., Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 441 days.

(21) Appl. No.: 11/933,686

(22) Filed: Nov. 1, 2007

(51) Int. Cl.
*G06F 17/30* (2006.01)

(52) U.S. Cl. ........ 707/812; 707/783; 707/792; 707/802; 707/825

(58) Field of Classification Search .................. 707/783, 707/792, 802, 812, 825
See application file for complete search history.

(56) References Cited

U.S. PATENT DOCUMENTS

| | | | |
|---|---|---|---|
| 7,191,346 B2 * | 3/2007 | Abe et al. ..................... 713/194 |
| 7,580,950 B2 * | 8/2009 | Kavuri et al. ............. 707/103 R |
| 7,590,808 B2 * | 9/2009 | Lam et al. ..................... 711/161 |
| 7,599,941 B2 * | 10/2009 | Bahar et al. ..................... 707/10 |
| 7,761,586 B2 * | 7/2010 | Olenick et al. ................ 709/230 |
| 7,844,820 B2 * | 11/2010 | Martinez ....................... 713/176 |
| 2003/0050974 A1 * | 3/2003 | Mani-Meitav et al. ....... 709/203 |
| 2005/0240393 A1 * | 10/2005 | Glosson ........................... 704/8 |
| 2006/0031230 A1 * | 2/2006 | Kumar ............................ 707/10 |
| 2007/0022129 A1 * | 1/2007 | Bahar et al. .................. 707/100 |
| 2007/0106852 A1 * | 5/2007 | Lam et al. ..................... 711/154 |
| 2007/0288518 A1 * | 12/2007 | Crigler et al. ............. 707/104.1 |
| 2008/0177755 A1 * | 7/2008 | Stern et al. .................... 707/100 |
| 2008/0222201 A1 * | 9/2008 | Chen et al. ................ 707/104.1 |
| 2009/0112880 A1 * | 4/2009 | Oliveira et al. ................ 707/10 |

* cited by examiner

*Primary Examiner* — Shahid Alam
*Assistant Examiner* — Andalib Lodhi
(74) *Attorney, Agent, or Firm* — Krishnendu Gupta; Robert Kevin Perkins; Joseph D'Angelo (57) ABSTRACT

Embodiments of the invention relate to determining the lineage of a content unit stored on an object addressable storage (OAS) system. When a content unit that is derived from at least one other content unit is stored on an OAS system, metadata that identifies the source content unit(s) from which the at least one content unit was derived may be stored. This metadata may be subsequently used to determine the lineage of the content unit.

23 Claims, 7 Drawing Sheets

DETERMINING THE LINEAGE OF A CONTENT UNIT ON AN OBJECT ADDRESSABLE STORAGE SYSTEM

FIELD OF INVENTION

The present application relates to computer systems employing object addressable storage.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referred to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments OAS systems may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY OF THE INVENTION

One embodiment is directed to a method for use in a computer system which stores a first content unit and a second content unit on at least one object addressable storage (OAS) system, wherein the first and second content units stored on the OAS system each is identifiable to the OAS system via an associated object identifier that, from the perspective of an entity accessing content units on the at least one OAS system, is independent of a storage location of the content unit on the at least one OAS system, wherein the first content unit comprises content derived at least partially from content of the second content unit. The method comprises an act of: storing on the at least one OAS system a third content unit that comprises the object identifier for the first content unit and metadata relating to the first content unit, the metadata identifying the second content unit as a source from which the content of the first content unit is at least partially derived. A further embodiment is directed to at least one computer readable medium encoded with instructions that, when executed, perform the above-described method.

Another embodiment is directed to at least one object addressable storage (OAS) system which stores a first content unit and a second content unit, wherein the first and second content units stored on the OAS system each is identifiable to the OAS system via an associated object identifier that, from the perspective of an entity accessing content units on the at least one OAS system, is independent of a storage location of the content unit on the at least one OAS system, wherein the first content unit comprises content derived at least partially from content of the second content unit, and wherein the at least one OAS system comprises: at least one storage device; and at least one controller that: stores, on the at least one storage device, a third content unit that comprises the object identifier for the first content unit and metadata relating to the first content unit, the metadata identifying the second content unit as a source from which the content of the first content unit is at least partially derived.

A further embodiment is directed to a method comprising an act of: determining, for a first content unit stored on at least one object addressable storage (OAS) system, at least one second content unit stored on the at least one OAS system from which the first content unit is derived by accessing metadata associated with the first content unit, wherein the first content unit and the at least one second content unit each is identifiable to the OAS system via an associated object identifier that, from the perspective of an entity accessing content units on the at least one OAS system, is independent of a storage location of the content unit on the at least one OAS system, and wherein the metadata associated with the first content unit identifies the at least one second content unit from which the first content unit is derived via its object identifier. Another embodiment is directed to at least one computer readable medium encoded with instructions that, when executed, perform the above-described method.

DETAILED DESCRIPTION

Some embodiments of the invention relate to determining the lineage of a content unit. That is, Applicants have appreciated that some content units are derived, at least partially, from one or more other sources, and that it may be desirable to be able to identify these sources and/or recover the data from which the content unit was derived. The ability to identify the sources of a unit of content is useful for a variety of reasons, such as, for example, to determine copyright royalty fees incurred by a unit of content.

Applicants have appreciated that traditional file systems are ill-suited for tracking the lineage of a content unit. For example, because files stored in file systems may be modified, deleted, or moved, metadata stored in a file system that identifies sources from which a content unit is derived may be deleted or modified. In addition, the metadata for a content unit may be moved to a different location so that its association with the content unit is lost. In addition, if the source content is stored in a file system, the source content may also be modified, deleted, or lost. Thus, even if metadata exists for a content unit and identifies source content from which the content unit was derived, the source content may have been modified or deleted, such that it may be difficult or impossible to prove that it was a source from which the content unit was derived.

Applicants have further appreciated that tracking the lineage of content derived from world wide web (WWW) content presents similar challenges. WWW web pages can be modified or moved. Thus, identifying a source from which a content unit is derived using a web address, e.g., a uniform resource locator (URL), is not reliable because the content at the web address may have changed, making it difficult or impossible to prove that it was the source of a content unit.

It should be appreciated that while some embodiments of the invention may address some or all of the limitations of tracking the lineage of file system and/or WWW content, the invention is not limited in this respect, as some embodiments may not address any of these limitations. Moreover, the invention is not limited to tracking the lineage of file system or WWW content, as the lineage of any suitable type of content may be tracked.

Some embodiments of the invention relate to tracking the lineage of a unit of data using an object addressable storage (OAS) system. An OAS system is one in which content units stored thereon are identified by unique object identifiers that are independent, from the perspective of entities accessing content units on the OAS system, of any particular storage location on the OAS system. This allows metadata for a content unit to identify source content units on the OAS system, regardless of where these source content units are stored on the OAS system, and regardless of whether these source content units are moved to different storage locations in the OAS system.

Figure 7:
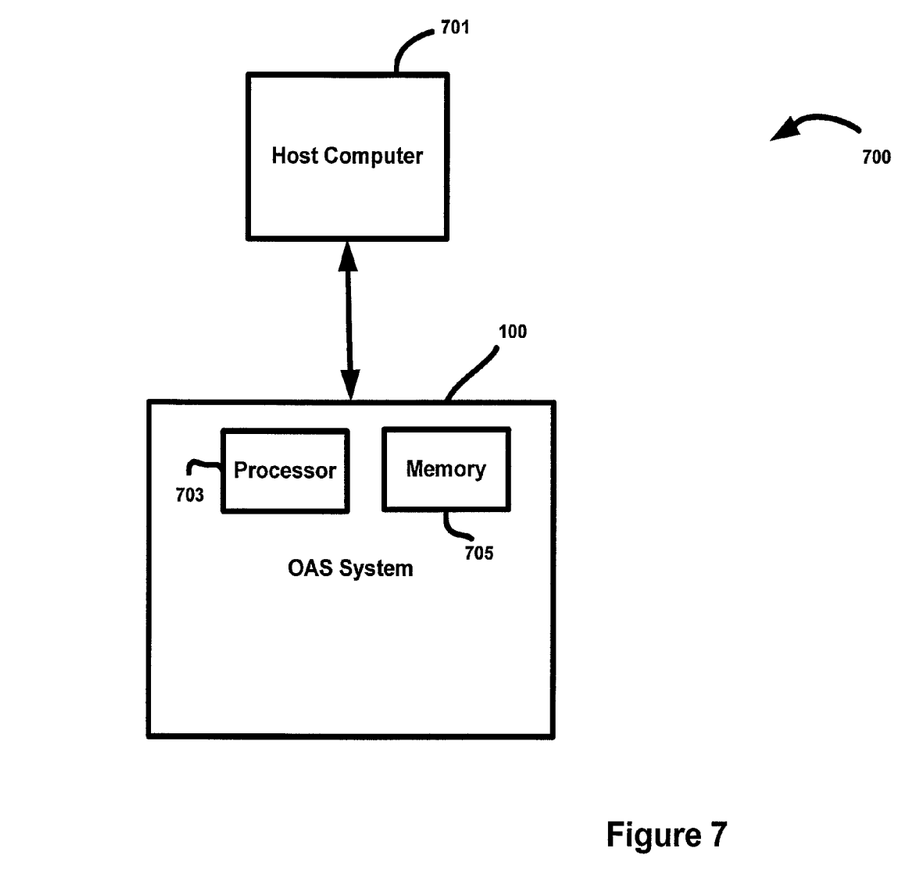
FIG. 7 is a block diagram of a computer system on which some embodiments may be implemented.

FIG. 7 is a simplified block diagram of an example of a computer system in which some embodiments of the invention may be implemented. As shown in FIG. 7, computer system 700 includes an OAS system 100 and a host computer 701 that access content units on the OAS system 100. OAS system 100 includes a processor 703 for processing access requests and performing other storage management tasks, and a memory 705 which may store instructions executable by processor 703 for processing access requests and performing other management tasks. As discussed above, content units stored on OAS system 100 may be identified by object identifiers that, from the perspective of host computer 701, are independent of any storage location on the OAS system.

In some embodiments, the OAS system may be a content addressable storage (CAS) system, in which the object identifier for a content unit is a content address that is generated, at least in part, based on at least a portion of the content of the content unit. Using a content address as the identifier for a content unit enables verification that a source content unit has not been modified since it was used as a source for another content unit. That is, because the content address is generated from the content of the source content unit, if the content of this content unit changes, then its content address will also change. Thus, to verify that the content of a content unit has not changed, its content address may be recomputed and compared with its original content address.

In some embodiments, the OAS system may provide a way to associate with a derived content unit the metadata that identifies the source content unit(s) from which the derived content is derived. This may be done in any suitable way, as the invention is not limited in this respect.

For example, in some embodiments, the metadata for a content unit may be associated with the content unit using a CDF/blob architecture. In such an architecture, there are at least two types of content units: blobs and content descriptor files (CDFs). Each blob has at least one CDF associated with it. A CDF stores metadata about the content stored in its associated blob(s) and also includes a pointer to its associated blob(s). Because the CDF and its associated blob(s) are separate content units on an OAS system, each may have a separate object identifier and may be separately addressable via its object identifier. Examples of systems that employ a CDF/blob architecture are discussed in greater detail in some of the applications listed below in Table 1.

In some embodiments, the metadata identifying the source content unit(s) from which a content unit is derived may be stored in the CDF for the content unit. In some embodiments, the CDF may also include additional metadata about the blob that it references. For example, the CDF may include metadata about the time of creation of the blob, the size of the blob, the user who created the blob, or any other suitable metadata.

In some embodiments, the metadata identifying the source content units from which a content unit was derived may be associated with the content unit using a XAM X-Set. XAM refers to the Storage Networking Industry Association's (SNIA) proposed Extensible Access Method (XAM) standard. In the XAM standard, an X-Set is an object that includes data and metadata about the data. A detailed discussion of the XAM standard can be found on the SNIA web site at http://www.snia.org/xam/home. Thus, in some embodiments, the metadata identifying the source content unit(s) may be stored in an X-Set with the content unit.

A CDF/blob and a XAM X-Set are only examples of ways in which metadata identifying one or more sources from which the content of a content unit was derived may be associated with the derived content unit. The invention is not limited to any particular way of associating such metadata with an associated content unit.

Tracking the data lineage of a content unit on an OAS system may be done in any suitable way. For example, in some embodiments, when a content unit that is derived from one or more other content units is stored on the OAS system, metadata may be stored identifying the source content unit(s) from which the content unit is derived. The metadata may identify the source content units in any suitable way, as the invention is not limited in this respect. For example, in some embodiments, metadata associated with a content unit may identify a source content unit from which the content unit was derived via the object identifier for the source content unit.

In some embodiments, in addition to identifying the source content unit(s) from which a content unit was derived, metadata for a content unit may indicate the algorithm used to derive the content unit from the source content unit(s). As used herein, the term algorithm can include any function or process applied to source content to generate derived content.

An example of tracking the data lineage of content unit on an OAS system is described below. In this example, ACME Co. suspects an employee of publicly disclosing company secrets and wishes to search blogs published on the WWW to determine whether these blogs reveal any company secrets and whether any of these blogs were written by company employees.

In this example, one million blogs are captured and each is stored as a content unit on an OAS system. It should be appreciated that although in the example below, a single OAS system is used to capture content and store the data lineage of content units, the invention is not limited in this respect, as multiple OAS systems may be used.

Figure 1:
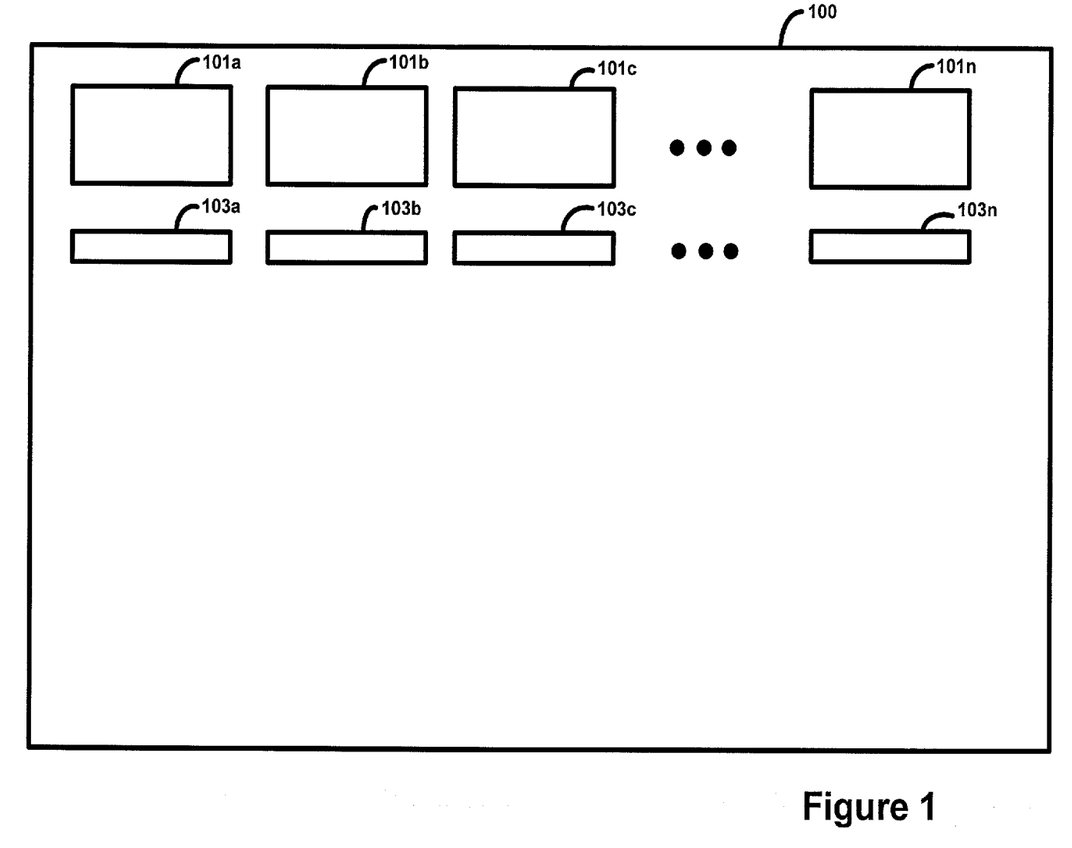
FIGS. 1-5 are block diagrams of object addressable storage (OAS) systems which store metadata identifying source content units for content units stored thereon, in accordance with some embodiments of the invention.

In FIG. 1, each blog 101a ... 101n is stored as a content unit on OAS system 100 and each is assigned an object identifier. In addition, for each content unit, metadata about the content unit may be stored and associated with the content unit. For example, metadata 103a may include metadata about content unit 101a and may be associated with content unit 101a. Metadata 103 may include any suitable data about the content of its associated content unit. For example, the metadata 103 for a content unit may indicate the date at which the content was retrieved, the author of the content, the location from which the content was retrieved, and/or any other suitable information.

In addition, metadata may be associated with the content unit in any suitable way, including any of the ways for associating metadata with a content unit described above.

Figure 2:
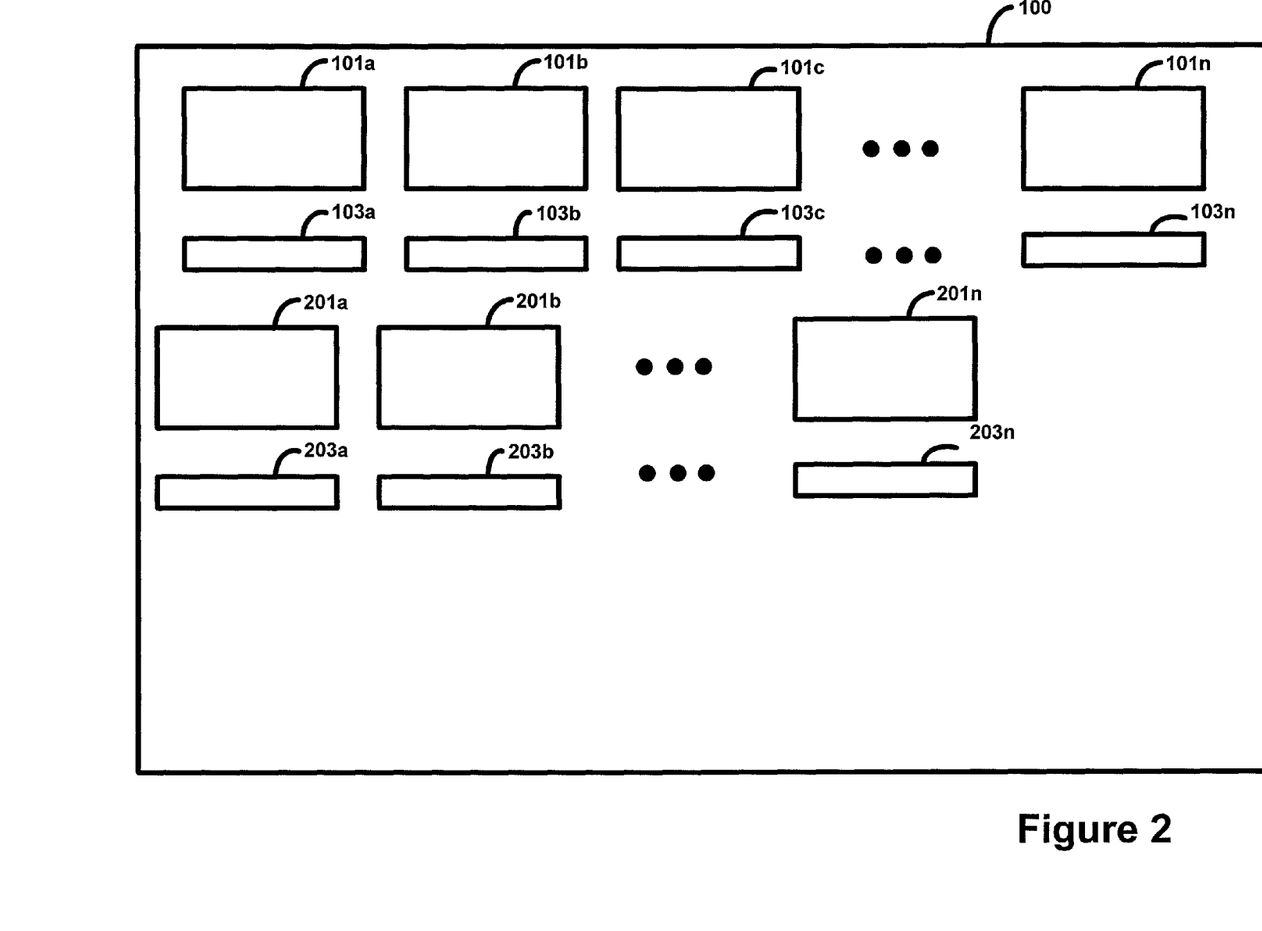

Once each captured blog is stored as a content unit on the OAS system, these content units may be filtered to identify blogs related to ACME Co, and each identified blog may be stored as a content unit on the OAS system. For example, as shown in FIG. 2, content units 101 may be filtered to identify blogs related to ACME co, and each identified blog may be stored as a content unit 201. Each content unit 201 may be associated with metadata 203 that identifies the content unit 101 from which its associated content unit was derived. Thus, in the example of FIG. 2, deriving a content unit from a source content unit is done simply by copying all of the content of the source content unit and storing it in the derived content unit. However, as discussed in other examples below, the invention is not limited in this respect, as deriving a content unit from a source content unit need not involve copying all of the content of the source content unit, and content units may be derived from source content units in any suitable way.

The metadata 203 for a content unit 201 may identify the content unit 101 from which its associated content unit 201 was derived in any suitable way, as the invention is not limited in this respect. In some embodiments, the metadata may identify the content unit 101 via its object identifier. Thus, for example, if content unit 201b is derived from content unit 101a, then metadata 203b for content unit 201b may identify content unit 101a as the source for content unit 201b by storing the object identifier for content unit 101a. Alternatively, metadata 203 may identify content unit 101 indirectly. This may be done in any suitable way. For example metadata 203 may identify a content unit 101 by identifying the metadata 103 that is associated with the content unit 101.

In addition to storing information about the source of its associated content unit, the metadata 203 for a content unit may store any other suitable information about the content of its associated content unit, as the invention is not limited in this respect. For example, in some embodiments, the metadata 203 for a content unit 201 may specify the algorithm used to derive the content unit 201 from its source content unit(s). Thus, for example, metadata 203b for content unit 201b may indicate that it was created by scanning all of content units 101 for the word "ACME," determining that content unit 101a includes the word "ACME," and copying the content of content unit 101a to create content unit 201b.

Figure 3:
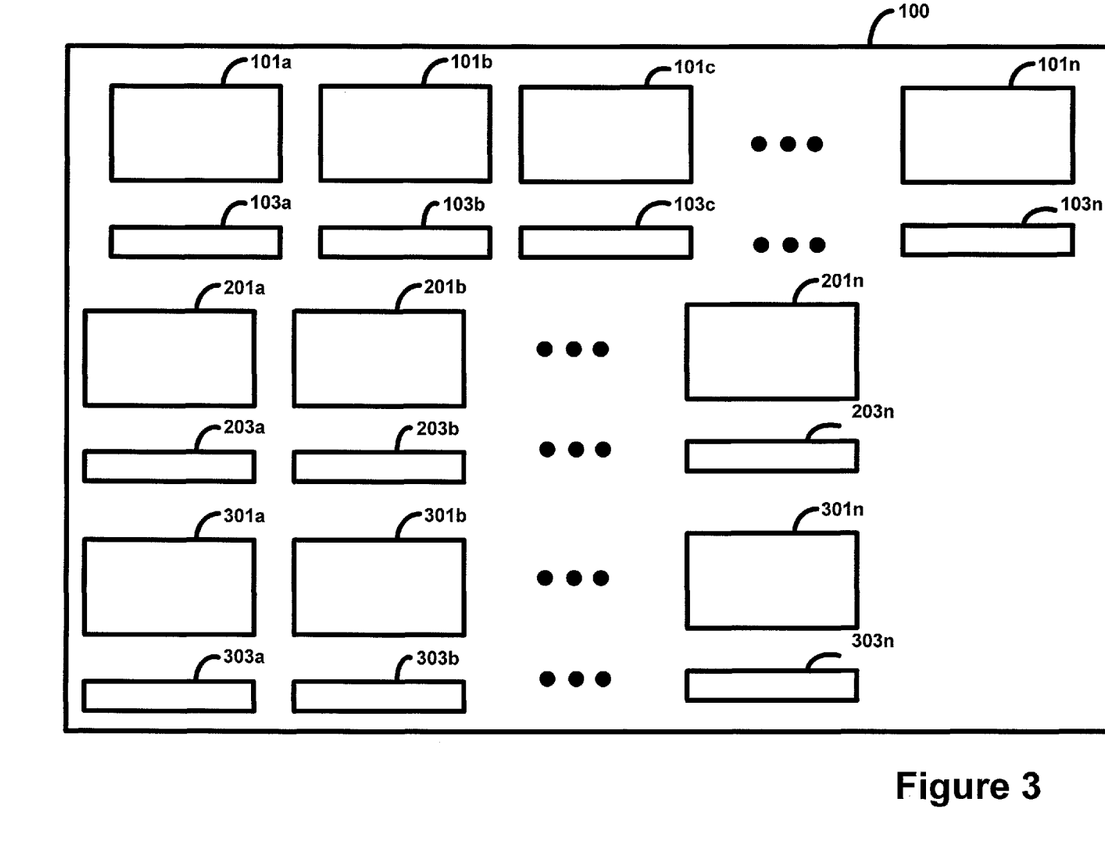

Once the content units 101 have been filtered to create content units 202, content units 202 may be sorted by author, and all of the content units for each author may be concatenated into a single content unit. For example, as shown in FIG. 3, content units 301a ... 301n may be created and stored on OAS system 100. Each of content units 301 may be, for example, a concatenation of two or more of content units 201 that have the same author. Each content unit 301 may be associated with metadata 303. The metadata 303 associated with a content unit 301 may indicate from which content units 201 the content unit 301 is derived, and may include any other suitable information about the associated content unit, such as, for example, information identifying the algorithm used to derive the content unit.

Figure 4:
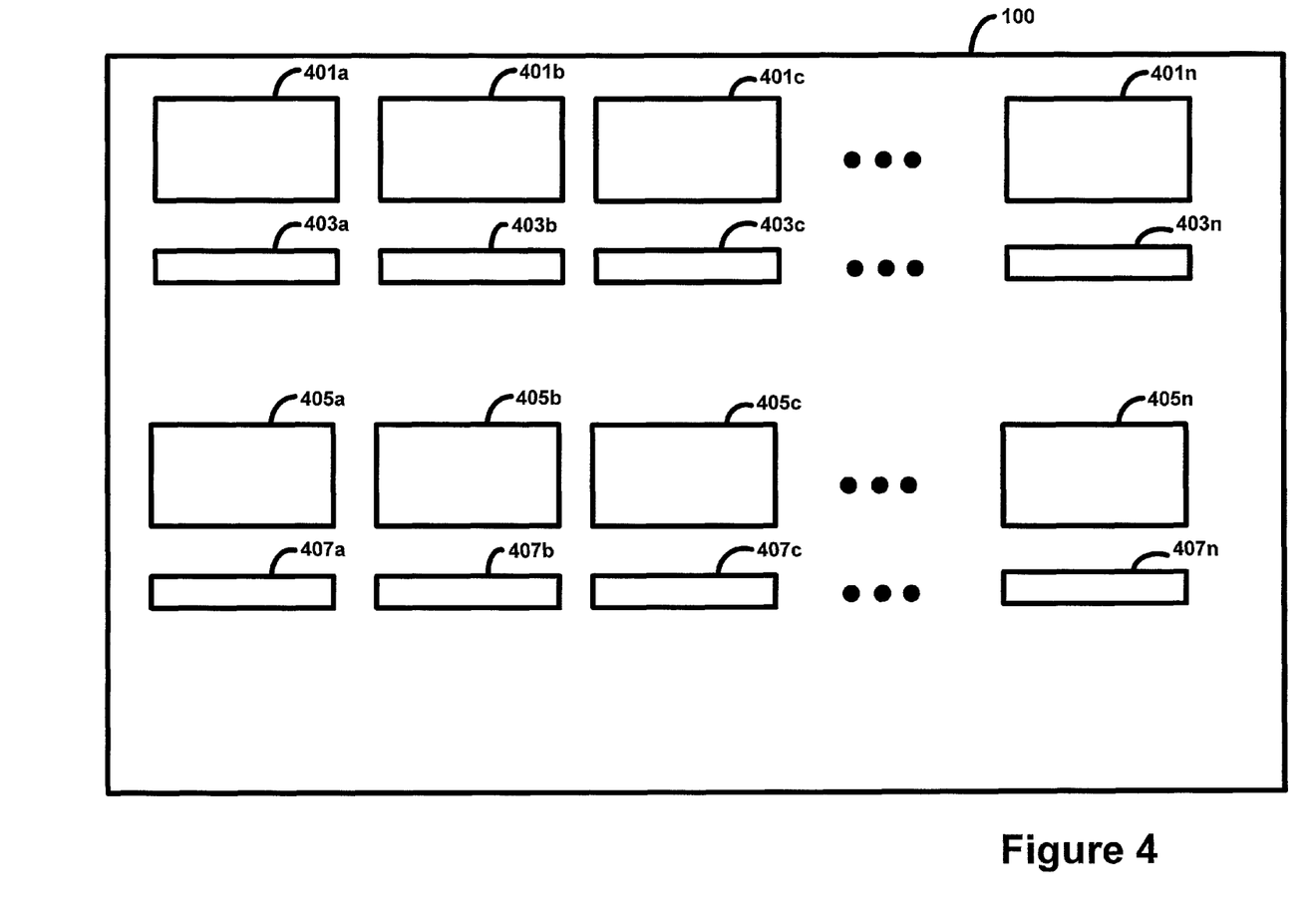

Next, the content of content units 301 may be compared to the writing styles of employees to determine if any of these content units were potentially written by an ACME employee. For example, as shown in FIG. 4, employee writing samples may be captured and stored as content units on OAS system 100. Thus, for example, in FIG. 4, each content unit 401 may store an employee writing sample and each content unit 401 may have associated metadata 403 that may include information about the content of its associated content unit. For example, the metadata 403 for a content unit 401 may specify the name of the employee that wrote the writing sample stored in the content unit, the date that the employee wrote the writing sample, and/or any other suitable information.

A writing style analysis may be performed on each of content units 401 and the writing style analysis for each content unit may be stored in a content unit 405 on OAS system 100. For example, the writing style analysis of content unit 401a may be stored in content unit 405a on OAS system 100. Content units 407 may each be associated with a content unit 405. Each content unit 407 may include metadata that identifies the content unit(s) 401 from which its associated content unit 405 is derived.

A writing style analysis may be performed in any suitable way, as the invention is not limited in this respect. In addition, each content unit 405 may be associated with metadata that identifies the content unit 401 from which it was derived, the algorithm used to derive the content unit, and/or any other suitable metadata.

Next, the style analysis content units 405 may be compared with concatenated blog content units 301 to determine if any blog content matches any employee's writing style. This may be done in any suitable way, as the invention is not limited in this respect.

In some embodiments discussed above, metadata for a content unit may identify an algorithm used in generating the content unit. This may be done in any suitable way as the invention is not limited in this respect. In some embodiments, the metadata may identify an algorithm used in generating the content by identifying an executable file that is stored in a content unit on an OAS system. The metadata my identify this content unit, for example, by its object identifier, or may identify the content unit indirectly by identifying a content unit (e.g., a CDF) that points to the content unit that stores the executable file.

For example, in the example of FIG. 4 a writing style analysis algorithm is used to generate content units 405 from content units 401. The metadata 407 may identify the algorithm used to generate its associated content unit 405 by identifying (either directly or indirectly) a content unit that stores an executable file (e.g., a Windows executable or any other type of executable) used to perform the writing style analysis.

Figure 5:
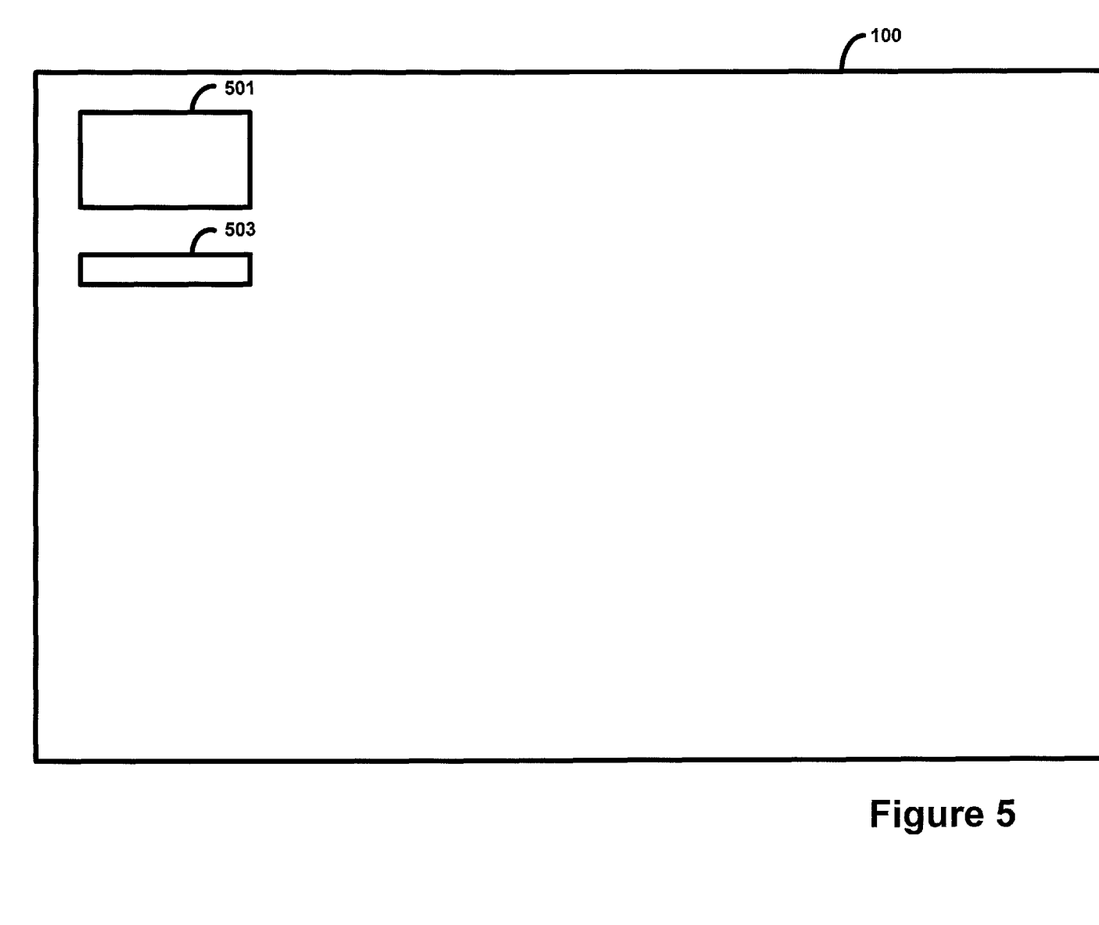

A result content unit may be created and stored on the OAS system that stores the result of this comparison. For example, as shown in FIG. 5, a result content unit 501 may be stored on OAS system 100 identifying the employees that potentially authored blogs. Metadata 503 for content unit 501 may also be stored and may identify the content units from which result content unit was derived. That is, for example, the metadata 503 may identify each content unit 405 that matched a blog in a content unit 301 and each content unit 301 that matched a writing style in a content unit 405. In some embodiments, metadata 503 may also indicate the algorithm used to generate result content 501. For example, metadata 503 may specify the algorithm used to compare the writing style analyses in content unit 405 with the blog content in content units 301.

If it is desired to track the lineage of the result content unit, its associated metadata may be accessed to determine the source content units from which it was derived. Similarly, if it is desired to determine the lineage of any source content unit, the metadata of the source content unit may be accessed to determine from which, if any, content unit(s) it is derived.

Figure 6:
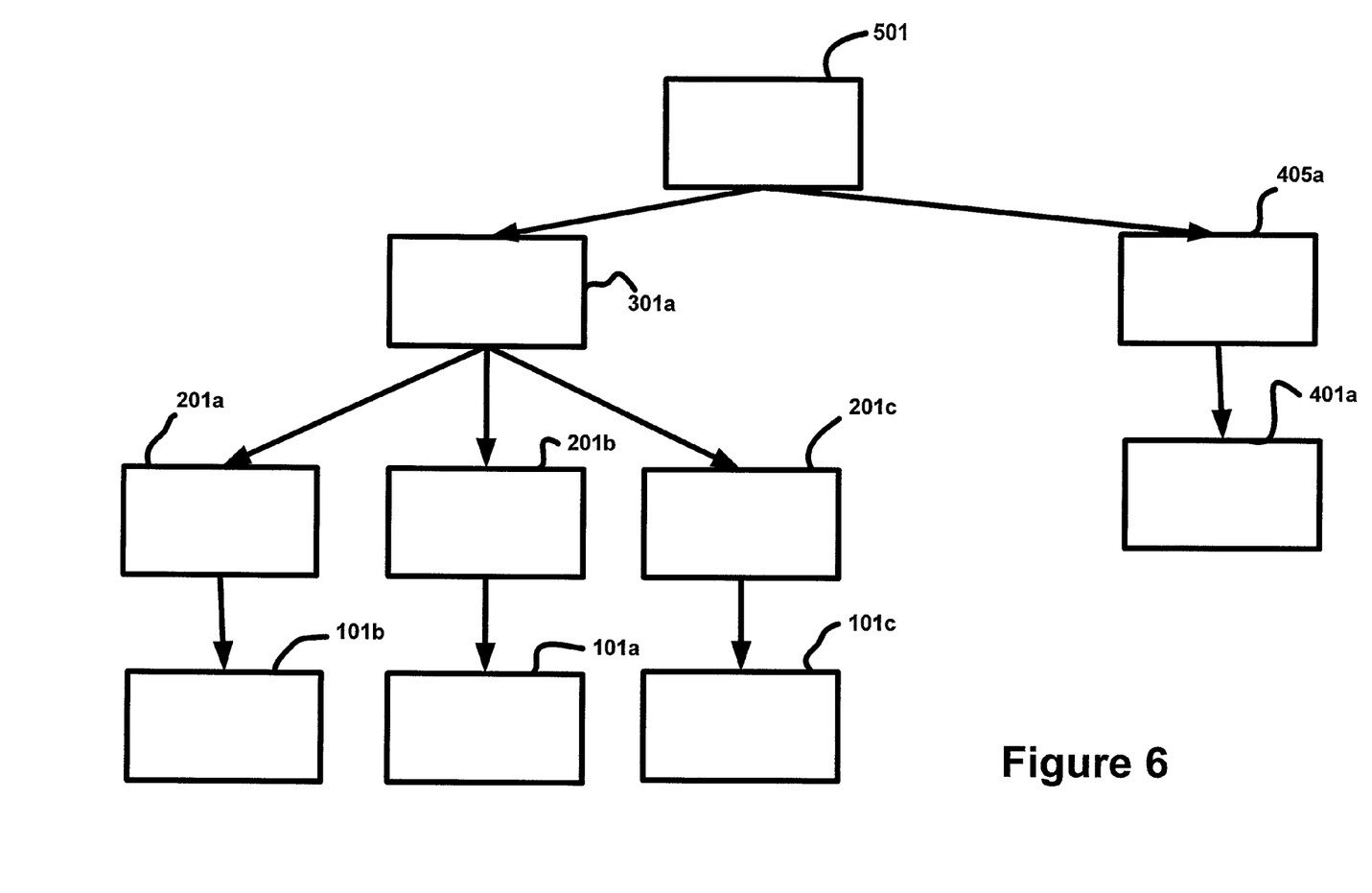
FIG. 6 is a block diagram of a directed acyclic graph showing the lineage of content unit, in accordance with some embodiments of the invention.

In some embodiments, the lineage of a content unit may be represented in a directed acyclic graph. For example, as shown in FIG. 6, result content unit 501 may be derived from style analysis content unit 405 and concatenated blog content unit 301*a*. Content unit 405*a* may be derived from content unit 401*a*, and content unit 301*a* may be derived from content units 201*a*, 201*b*, and 201*c*, and content units 201*a*, 201*b*, and 201*c* may be derived, respectively, from content units 101*b*, 101*a*, and 101*c*. A graph such as that shown in FIG. 6 may be generated using the metadata for each content unit which identifies the source content units from which the content unit was derived.

Because metadata may stored at each level in the graph identifying the source content units for each content unit and indicating the algorithm used to generate the source content units, different algorithms may be applied to the content to produce different results. For example, if it is desired to use a different writing style analysis algorithm to analyze employee writing styles, content units 401 may be created and analyzed with new algorithm to generate new writing style analysis content units. These content units may then be compared to concatenated blog content units 301 to generate a new result content unit.

It should be appreciated that the example described above in connection with FIGS. 1-5 is but one example of a situation in which the lineage of content units may be tracked on one or more OAS systems. The invention is not limited to the example described above, as the lineage of any suitable type of content unit may be tracked. In the example above, the lineage of content units derived from content captured from the WWW was tracked. However, the invention is not limited in this respect, as the lineage of content units derived from any suitable source may be tracked. In addition, the invention is not limited to deriving a content unit from one or more source content units via writing style analysis of a source content unit, comparison to another content unit, or copying of a source content unit, as any suitable algorithm may be used to derive a content unit from one or more source content units.

Data lineages for content units may be created in any suitable way, as the invention is not limited in this respect. For example, in some embodiments, the lineage for a content unit may be created by an application program that stores content units on an OAS system.

For example, it may be desired to perform a writing style analysis of an document written by an employee that is stored as a content unit on an OAS system and to use a writing style analysis program that takes a document as input and generates as output a file having a list of writing characteristics that characterize the writing style used by the author of the document.

In some embodiments an application program (e.g., an application program that executes on a host computer that communicates with an OAS system, on the OAS system itself, or on any other suitable system) may be used to create a data lineage relationship between the employee document and the file generated by the writing style analysis program. This may be done in any suitable way, as the invention is not limited in this respect.

For example, after the handwriting analysis program has generated the file with the list of writing characteristics, an application program may store the information output by the program as a content unit on the OAS system and store metadata associated with this content unit that identifies (either directly or indirectly) the content unit on the OAS system that stores the employee document. In some embodiments, this metadata may also identify the algorithm used in deriving the content unit from its source(s). As discussed above, the metadata may identify the algorithm in any suitable way.

For example, if the application program is aware that the writing style analysis program used to generate the content unit exists in a certain storage location on a particular server, it may store a second content unit that identifies the location of the writing style analysis program on that server. Additionally, the application may include information, in the metadata associated with the content unit that stores the list of writing characteristics, that identifies the second content unit. This information may identify the second content unit in any suitable way, such as, for example, using the object identifier of the second content unit or in any other suitable way.

Once a data lineage has been created and stored on an OAS system (e.g. using the above-described techniques), the data lineage may be navigated to determine the source of one or more content units in the lineage. This may be done in any suitable way, as the invention is not limited in this respect.

In some embodiments, an application program may navigate a data lineage by accessing the metadata stored on the OAS system that is associated with a content unit to determine from which source content unit(s) the content unit was derived. This may be done in any suitable way, as the invention is not limited in this respect.

For example, as discussed above, an OAS system may store a content unit which has a list of writing characteristics that characterize the writing style used in a particular document, and may store metadata associated with this content unit that identifies the source content unit from which it was derived (e.g., the content unit that stores the document).

An application program may send a request to the OAS system to access the metadata associated with the content unit, and use the metadata to determine the source content unit from which this content unit was derived and, in some embodiments, the algorithm(s) used to derive the content unit from its source. Once the application program has determined the source content unit, it may, if desired retrieve the source content unit from the OAS system.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |

TABLE 1-continued

| Title | Ser. No. | Filing Date |
|---|---|---|
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |
| Methods And Apparatus For Transferring Content From A Storage System | 11/392,969 | Mar. 28, 2006 |
| Methods And Apparatus For Requesting Content From A Storage System | 11/391,654 | Mar. 28, 2006 |
| Methods And Apparatus For Transferring Content To Multiple Destinations | 11/392,981 | Mar. 28, 2006 |
| Methods And Apparatus For Receiving Content From A Storage System At Multiple Servers | 11/390,878 | Mar. 28, 2006 |
| Methods And Apparatus For Transferring Content From An Object Addressable Storage System | 11/390,564 | Mar. 28, 2006 |
| Methods And Apparatus For Requesting Content From An Object Addressable Storage System | 11/391,636 | Mar. 28, 2006 |
| Methods And Apparatus For Conversion Of Content | 11/438,770 | May 23, 2006 |
| Methods And Apparatus For Selecting A Data Format For A Content Unit | 11/439,025 | May 23, 2006 |
| Methods And Apparatus For Accessing A Content Unit On A Storage System | 11/439,022 | May 23, 2006 |
| Methods And Apparatus For Enabling Selection Of A Content Unit Data Format | 11/438,817 | May 23, 2006 |
| Methods And Apparatus For Accessing Content | 11/474,658 | Jun. 26, 2006 |
| Methods And Apparatus For Providing Access To Content | 11/474,846 | Jun. 26, 2006 |
| Methods And Apparatus For Retrieving Stored Content | 11/474,655 | Jun. 26, 2006 |
| Methods And Apparatus For Accessing Content Through Multiple Nodes | 11/474,661 | Jun. 26, 2006 |
| Methods And Apparatus For Receiving Content | 11/474,719 | Jun. 26, 2006 |
| Methods And Apparatus For Processing Access Requests | 11/474,749 | Jun. 26, 2006 |
| Methods And Apparatus For Providing Content | 11/474,802 | Jun. 26, 2006 |
| Methods And Apparatus For Managing Content | 11/483,465 | Jul. 10, 2006 |
| Methods And Apparatus For Moving Content | 11/483,799 | Jul. 10, 2006 |
| Methods And Apparatus For Storing Content | 11/483,494 | Jul. 10, 2006 |
| Methods And Apparatus For Caching Content In A Computer System Employing Object Addressable Storage | 11/519,374 | Sep. 12, 2006 |
| Methods And Apparatus For Selection Of A Storage Location For A Content Unit | 11/644,430 | Dec. 22, 2006 |
| Methods And Apparatus For Modifying An Object Identifier For A Content Unit | 11/644,423 | Dec. 22, 2006 |
| Methods And Apparatus For Storing Content On A Storage System | 11/644,174 | Dec. 22, 2006 |
| Methods And Apparatus For Increasing The Storage Capacity Of A Zone Of A Storage System | 11/644,857 | Dec. 22, 2006 |

TABLE 1-continued

| Title | Ser. No. | Filing Date |
|---|---|---|
| Methods And Apparatus For Selecting A Storage Zone For A Content Unit | 11/644,428 | Dec. 22, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a computer system, the method comprising acts of:
    storing a first content unit on at least one object addressable storage (OAS) system;
    storing a second content unit on the at least one OAS system;
    using the at least one OAS system to:
        identify the first content unit with a first object identifier that, from the perspective of an entity accessing the first content unit on the at least one OAS system, is independent of a first storage location of the first content unit on the at least one OAS system; and
        identify the second content unit with a second object identifier that, from the perspective of an entity accessing the second content unit on the at least one OAS system, is independent of a second storage location of the second content unit on the at least one OAS system;
    deriving content of the first content unit at least partially from content of the second content unit; and
    storing on the at least one OAS system a third content unit that comprises:
        the object identifier for the first content unit and metadata relating to the first content unit; and
        the metadata identifying the second content unit as a source from which the content of the first content unit is at least partially derived.

2. The method of claim 1, wherein:
    the at least one OAS system comprises at least one content addressable storage (CAS) system;
    the first object identifier comprises a first content address that is generated, at least in part, based on at least a portion of the content of the first content unit; and
    the second object identifier comprises a second content address that is generated, at least in part, based on at least a portion of the content of the second content unit.

3. The method of claim 1, wherein the OAS is system further used to:
    identify the third content unit with a third object identifier that, from the perspective of an entity accessing the third content unit on the at least one OAS system, is independent of a third storage location of the third content unit on the at least one OAS system.

4. The method of claim 1, further comprising an act of:
    storing, on the at least one OAS system, metadata identifying at least one algorithm used to derive the content of the first content unit from the content of the second content unit.

5. The method of claim 4, wherein the act of storing the metadata identifying the at least one algorithm used to derive the content of the first content unit from the content of the second content unit, further comprises an act of:
    storing the metadata identifying the at least one algorithm in the third content unit.

6. A least one computer readable medium encoded with instructions that, when executed, perform a method for use in a computer system, the method comprising acts of:
    storing a first content unit on at least one object addressable storage (OAS) system;
    storing a second content unit on the at least one OAS system;
    using the at least one OAS system to:
        identify the first content unit with a first object identifier that, from the perspective of an entity accessing the first content unit on the at least one OAS system, is independent of a first storage location of the first content unit on the at least one OAS system; and
        identify the second content unit with a second object identifier that, from the perspective of an entity accessing the second content unit on the at least one OAS system, is independent of a second storage location of the second content unit on the at least one OAS system;

deriving content of the first content unit at least partially from content of the second content unit; and storing on the at least one OAS system a third content unit that comprises:

the object identifier for the first content unit and metadata relating to the first content unit; and the metadata identifying the second content unit as a source from which the content of the first content unit is at least partially derived.

7. The at least one computer readable medium of claim 6, wherein:

the at least one OAS system comprises at least one content addressable storage (CAS) system;

the first object identifier comprises a first content address that is generated, at least in part, based on at least a portion of the content of the first content unit; and the second object identifier comprises a second content address that is generated, at least in part, based on at least a portion of the content of the second content unit.

8. The at least one computer readable medium of claim 6, wherein the OAS system is further used to:

identify the third content unit with a third object identifier that, from the perspective of an entity accessing the third content unit on the at least one OAS system, is independent of a third storage location of the third content unit on the at least one OAS system.

9. The at least one computer readable medium of claim 6, wherein the method further comprises an act of:

storing, on the at least one OAS system, metadata identifying at least one algorithm used to derive the content of the first content unit from the content of the second content unit.

10. The at least one computer readable medium of claim 9, wherein the act of storing the metadata identifying the at least one algorithm used to derive the content of the first content unit from the content of the second content unit, further comprises an act of:

storing the metadata identifying the at least one algorithm in the third content unit.

11. At least one object addressable storage (OAS) system comprising:

at least one storage device; and at least one controller that:

stores, on the at least one storage device, a first content unit and a second content unit, wherein the first and second content units are each identifiable to the at least one OAS system via an associated object identifier that, from the perspective of an entity accessing content units on the at least one OAS system, is independent of a storage location of the content unit on the at least one OAS system;

derives content of the first content unit at least partially from content of the second content unit;

stores, on the at least one storage device, a third content unit that comprises the object identifier for the first content unit and metadata relating to the first content unit, the metadata identifying the second content unit as a source from which the content of the first content unit is at least partially derived.

12. The at least one OAS system of claim 11, wherein the at least one OAS system comprises at least one content addressable storage (CAS) system, and wherein the object identifiers for the first and second content units each comprises a content address that is generated, at least in part, based on at least a portion of the content of its associated content unit.

13. The at least one OAS system of claim 11, wherein the third content unit is identifiable to the at least one OAS system via an associated object identifier that, from the perspective of an entity accessing content units on the at least one OAS system, is independent of a storage location of the third content unit on the at least one OAS system.

14. The at least one OAS system of claim 11, wherein the at least one controller:

stores, on the at least one storage device, metadata identifying at least one algorithm used to derive the content of the first content unit from the content of the second content unit.

15. The at least one OAS system of claim 14, wherein the at least one controller stores the metadata identifying the at least one algorithm in the third content unit.

16. A method comprising an act of:

determining, for a first content unit stored on at least one object addressable storage (OAS) system, at least one second content unit stored on the at least one OAS system from which the first content unit is derived by accessing metadata associated with the first content unit, wherein the first content unit and the at least one second content unit each is identifiable to the at least one OAS system via an associated object identifier that, from the perspective of an entity accessing content units on the at least one OAS system, is independent of a storage location of the content unit on the at least one OAS system, and wherein the metadata associated with the first content unit identifies the at least one second content unit from which the first content unit is derived via its object identifier, wherein the at least one OAS system comprises at least one content addressable storage (CAS) system, and wherein the object identifiers for the first content unit and the at least one second content unit each comprises a content address that is generated, at least in part, based on at least a portion of the content of its associated content unit.

17. The method of claim 16, wherein the metadata associated with the first content unit is stored in a third content unit on the at least one OAS system.

18. The method of claim 17, wherein the third content unit is identifiable to the at least one OAS system via an associated object identifier that, from the perspective of an entity accessing content units on the at least one OAS system, is independent of a storage location of the content unit on the at least one OAS system.

19. The method of claim 16, further comprising an act of:

determining at least one algorithm used to derive the first content unit from the at least one second content unit by accessing metadata associated with first content unit that identifies the at least one algorithm.

20. At least one non-transitory computer readable medium encoded with instructions that, when executed, perform a method comprising an act of:

determining, for a first content unit stored on at least one object addressable storage (OAS) system, at least one second content unit stored on the at least one OAS system from which the first content unit is derived by accessing metadata associated with the first content unit, wherein the first content unit and the at least one second content unit each is identifiable to the at least one OAS system via an associated object identifier that, from the perspective of an entity accessing content units on the at least one OAS system, is independent of a storage location of the content unit on the at least one OAS system, and wherein the metadata associated with the first content unit identifies the at least one second content unit from which the first content unit is derived via its object identifier and identifies an algorithm used to derive the first content unit from the second content unit, wherein the at least one OAS system comprises at least one content addressable storage (CAS) system, and wherein the object identifiers for the first content unit and the at least one second content unit each comprises a content address that is generated, at least in part, based on at least a portion of the content of its associated content unit.

21. The at least one non-transitory computer readable medium of claim 20, wherein the metadata associated with the first content unit is stored in a third content unit on the at least one OAS system.

22. The at least one non-transitory computer readable medium of claim 21, wherein the third content unit is identifiable to the at least one OAS system via an associated object identifier that, from the perspective of an entity accessing content units on the at least one OAS system, is independent of a storage location of the content unit on the at least one OAS system.

23. The at least one non-transitory computer readable medium of claim 20, wherein the method determining at least one algorithm used to derive the first content unit from the at least one second content unit by accessing metadata associated with first content unit that identifies the at least one algorithm.

* * * * *